(12) United States Patent
Acharya Chandrashekar et al.

(10) Patent No.: US 12,563,169 B1
(45) Date of Patent: Feb. 24, 2026

(54) VOLUMETRIC CAPTURE THROUGH INTERNET-OF-THINGS-BASED CAMERAS

(71) Applicant: INTERNATIONAL BUSINESS MACHINES CORPORATION, Armonk, NY (US)

(72) Inventors: Charan Acharya Chandrashekar, Bangalore (IN); Shridhara Hegde, Bengaluru (IN); Hemant Kumar Sivaswamy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/969,342

(22) Filed: Dec. 5, 2024

(51) Int. Cl.
   *H04N 13/296* (2018.01)
   *H04N 13/261* (2018.01)
(52) U.S. Cl.
   CPC ......... *H04N 13/261* (2018.05); *H04N 13/296* (2018.05)
(58) Field of Classification Search
   None
   See application file for complete search history.

(56) References Cited

U.S. PATENT DOCUMENTS

| | | | |
|---|---|---|---|
| 9,986,221 B2 | 5/2018 | Zhou | |
| 11,126,857 B1 * | 9/2021 | Maali | ................... G06V 10/147 |

| | | | |
|---|---|---|---|
| 2012/0234966 A1 * | 9/2012 | Biswell | ..................... F41G 7/34 |
| | | | 244/3.15 |
| 2015/0382001 A1 | 12/2015 | Newman et al. | |
| 2018/0196585 A1 | 7/2018 | Densham et al. | |
| 2024/0070969 A1 | 2/2024 | Vaish et al. | |
| 2024/0161784 A1 | 5/2024 | Rakshit et al. | |

FOREIGN PATENT DOCUMENTS

| | | | | |
|---|---|---|---|---|
| WO | 2019/034808 A1 | 2/2019 | | |
| WO | 2019/081087 A1 | 5/2019 | | |
| WO | WO-2022175602 A1 * | 8/2022 | ........... | G06V 20/582 |
| WO | WO-2025149308 A1 * | 7/2025 | ........... | H04N 21/845 |

OTHER PUBLICATIONS

STIC provided translation of WO2022/175602 A1 (Year: 2022).*

(Continued)

*Primary Examiner* — Tyler W. Sullivan

(74) *Attorney, Agent, or Firm* — Robert D. Bean

(57) ABSTRACT

According to one embodiment, a method, computer system, and computer program product for volumetric capture is provided. The present invention may include constructing a graph data structure representing a network topology of a volumetric array; and continually recording volumetric data of a subject using at least a threshold number of volumetric devices comprising the volumetric array by detecting the subject within a capture range of one or more of the volumetric devices responsive to determining that one or more volumetric devices in a recording state are not within capture range of the subject, switching the one or more volumetric devices to a standby state, and, responsive to determining that one or more volumetric devices in a standby state are within capture range of the subject, switching the one or more volumetric devices to the recording state.

20 Claims, 4 Drawing Sheets

(56) References Cited

OTHER PUBLICATIONS

Ala-eddine, Benrazek et al. "Efficient Camera Clustering Method Based on Overlapping FoVs for WMSNs". International Journal of Informatics and Applied Mathematics, vol. 1, No. 1, 2018, pp. 10-23. (Year: 2018).*

"BFS Graph Algorithm (With code in C, C++, Java and Python)", retrieved from web programiz.com/dsa/graph-bfs, dated Nov. 4, 2024, 6 pages.

"Capturing Volumetric Video", retrieved from web smpte.org/blog/capturing-volumetric-video, dated Nov. 4, 2024, 3 pages.

"Graph Data Structure", retrieved from programiz.com/dsa/graph, dated Nov. 4, 2024, 4 pages.

"Interconnected Segments Adjacencies in Market Ecosystems", Markets and Markets, retrieved from web https://www.marketsandmarkets.com/, dated Jan. 21, 2025, 4 pages.

"The trend the pragmatic metaverse will enhance the physical world, not replace it", IBM institute for Business Value, retrieved from web dated Nov. 4, 2024, 6 pages.

"Top Companies in Immersive Analytics Industry—IBM (US) and Microsoft (US), Google (US) | MarketsandMarkets", Immersive Analytics Market, retrieved from web IBM (US) and Microsoft (US) Immersive Analytics Market, dated Jan. 21, 2025, 4 pages.

"Volumetric Display Market Size, Share, Growth Analysis, By Display Type (Swept Volume, Static Volume), By End Use (Medi-cal, Aerospace & Defense), By Region—Industry Forecast 2025-2032", Skyquest, Dec. 2024, 13 pages.

"YOLO: Real-Time Object Detection", retrieved from web pjreddie.com/darknet/yolo, retrieved from web dated Nov. 4, 2024, 10 pages.

Antunes Jose. "Canon and IBM using volumetric video to promote visual arts", Aoinoqe, Jul. 13, 2021, 7 pages.

Archer Brent. "How Big Is a 4K Video per Hour & How to Compress 4K to Smaller Size", Digiarty WinxDVD, Dec. 21, 2023, 11 pages.

Bouts Quirijn William. "Geographic graph construction and visualization",Proefschrift, Nov. 30, 2017, 150 pages.

Gao et al. "Volumetric Video Processing", Frontiers, retrieved from web dated Nov. 4, 2024, 6 pages.

Granger et al. "It's time to bet on the future", IBM institute for Business Value, retrieved from web dated Nov. 4, 2024, 6 pages.

Heagerty et al. "HoloCamera: Advanced Volumetric Capture for Cinematic-Quality VR Applications", 2024, 9 pages.

IBM. "IBM Video Streaming Video Tours", retrieved from web https://video.ibm.com/recorded/132935305, dated Nov. 4, 2024, 4 pages.

Lee et al. "Groot: A Real-time Streaming System of High-Fidelity Volumetric Videos", MobiCom '20: Proceedings of the 26th Annual International Conference on Mobile Computing and Networking, Sep. 2020, 14 pages.

Leonard Marie-Anne. "Watching from within at Canon's volumetric video studio", Canon, 2019, 8 pages.

* cited by examiner

100

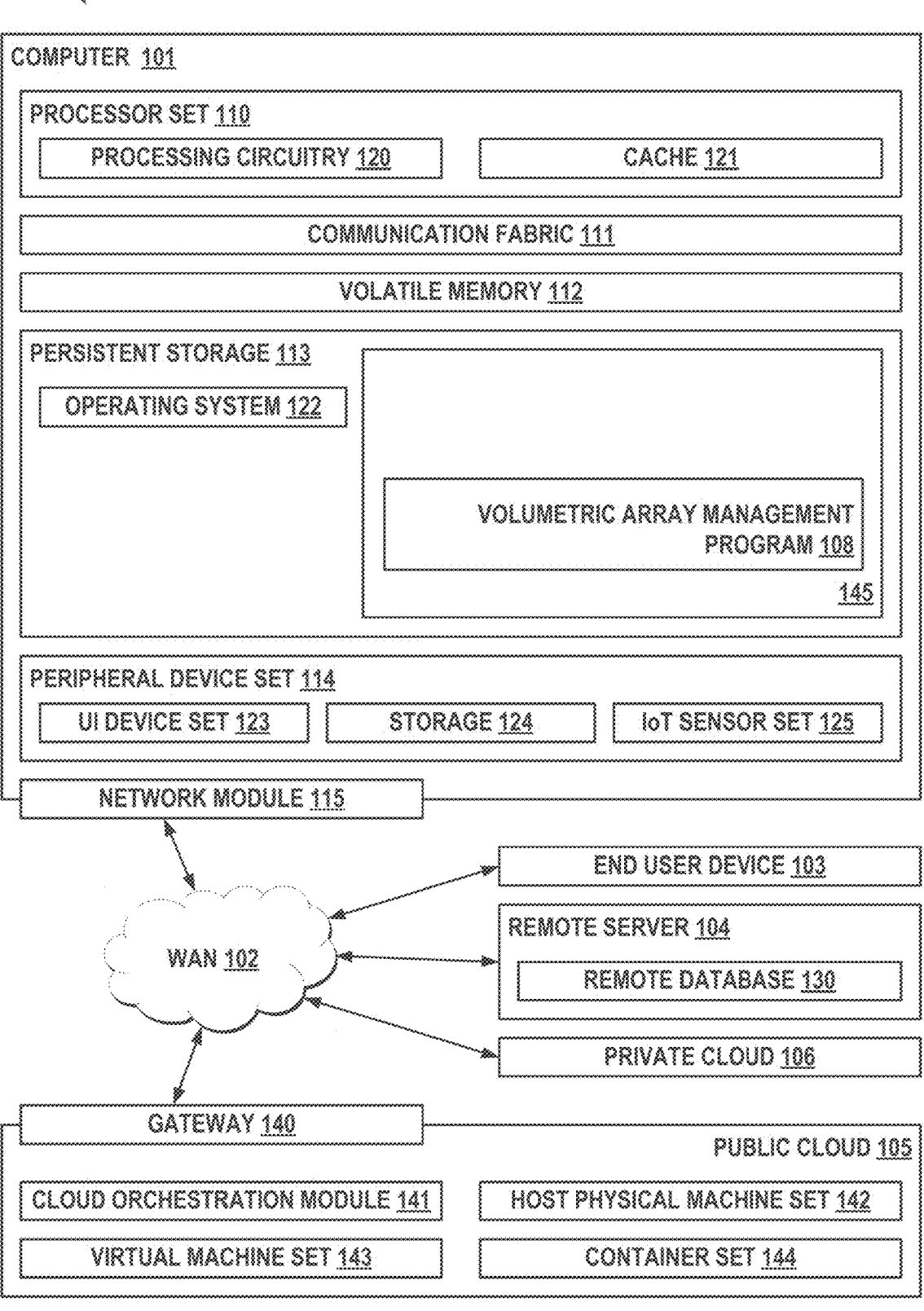

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

VOLUMETRIC ARRAY MANAGEMENT PROGRAM 108

145

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

FIG. 1

VOLUMETRIC CAPTURE THROUGH INTERNET-OF-THINGS-BASED CAMERAS

BACKGROUND

The present invention relates, generally, to the field of computing, and more particularly to volumetric capture.

The field of volumetric capture, or volumetric video, may be the technical field concerned with capturing a subject comprising a real-world physical object, environment, or entity by recording the subject from multiple angles, such that visual and spatial data on the subject is gathered from several perspectives; the final result is a volumetric asset comprising a fully interactive 3D model or volumetric video of the subject that users can use to view, manipulate, or explore the subject in a virtual space from multiple perspectives around and/or within the subject. Volumetric capture is ideal for an extraordinarily wide range of applications, including creating lifelike avatars, assets, and scenes for movies, mixed reality, and games, performing 3D modeling in a medical context for surgical planning or physical therapy, providing immersive educational experiences for teaching and training, and capturing live performances of events or athletic movements for replay and analysis. Through the growing advancements in the fields of computer graphics, optics, and data processing, volumetric capture has evolved into a powerful and versatile tool that combines the visual quality of photography with the immersion and interactivity of spatialized content.

SUMMARY

According to one embodiment, a method, computer system, and computer program product for volumetric capture is provided. The present invention may include constructing a graph data structure representing a network topology of a volumetric array; and continually recording volumetric data of a subject using at least a threshold number of volumetric devices comprising the volumetric array by detecting the subject within a capture range of one or more of the volumetric devices responsive to determining that one or more volumetric devices in a recording state are not within capture range of the subject, switching the one or more volumetric devices to a standby state, and, responsive to determining that one or more volumetric devices in a standby state are within capture range of the subject, switching the one or more volumetric devices to the recording state.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary networked computer environment according to at least one embodiment;

DETAILED DESCRIPTION

Figure 2:
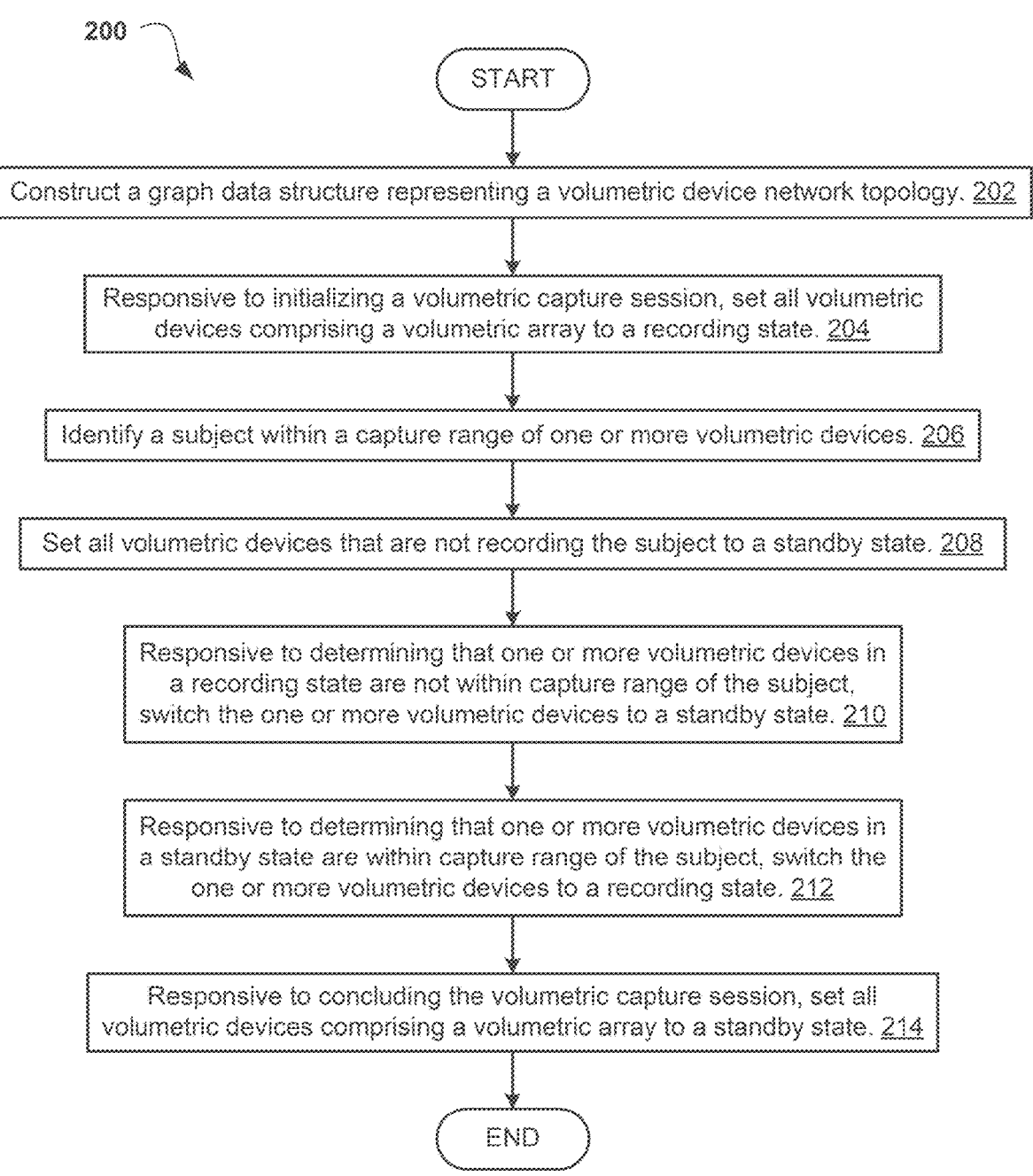
FIG. 2 is an operational flowchart illustrating a volumetric array management process according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to volumetric capture. The following described exemplary embodiments provide a system, method, and program product to, among other things, dynamically activate and de-activate volumetric capture devices of a volumetric capture array as a subject moves to continually record the subject with multiple volumetric devices.

As previously described, volumetric capture is a technique used for capturing a subject comprising a real-world physical object, environment, or entity by recording the subject from multiple angles, such that visual and spatial data on the subject is gathered from several perspectives; the final result is a volumetric asset comprising a fully interactive 3D model or volumetric video of the subject that users can use to view, manipulate, or explore the subject in a virtual space from multiple perspectives around and/or within the subject. Volumetric assets can be transferred to the web, mobile or virtual worlds for natural 3D viewing, and may be experienced through virtual reality (VR), mobile, computer etc., allowing viewers to interact with the scene or object in a 3D space. Volumetric video can be live, or a replay of existing video. Volumetric capture enables true 3D interactivity, and provides a high level of realism and immersion that ordinary videos or 3D models cannot achieve.

To create a volumetric asset, specialized hardware is necessary; positional and spatial data of the subject must be simultaneously captured from multiple perspectives in order to enable the volumetric effect that characterizes volumetric capture. As such, creating a volumetric asset requires the use of a specialized volumetric array comprising multiple volumetric devices positioned around the subject to collect volumetric data; volumetric devices may be visual sensors such as cameras to record the color, texture, movement, et cetera of the subject, positional sensors such as depth sensors, structured light scanners, time-of-flight sensors, light detection and ranging (LiDAR) sensors, et cetera to collect spatial data about the subject's position and structure, and/or volumetric cameras, which may be composite devices comprising at least one visual sensor and at least one spatial sensor. The volumetric array may be mounted in a specialized rig or studio configuration with precise spacing and orientation of the volumetric devices. Specialized software may process the depth data and perform synchronization and pre-processing to reconstruct the subject in three dimensions. Techniques such as photogrammetry, depth mapping, or point cloud generation may be employed to create the volumetric asset from the data collected by the volumetric array.

The volumetric devices may comprise Internet of Things (IoT) sensors, such as IoT cameras, to record data on the subject from remote devices positioned in dispersed locations throughout a recording studio, and transmit that data to a centralized message broker using integrated transmission devices and/or software capabilities. IoT is a collection of devices such as vehicles, home appliances, computers, mobile devices, sensors, and any real-world object embedded with networking technology which are capable of connecting, interacting, and exchanging data with each other over a network. IoT technology allows multiple devices to work together and accomplish tasks or provide information far beyond the capabilities of each individual device.

Due to the complexity of the task of creating volumetric assets, and the complexity of the required hardware, current implementations of volumetric capture face particular challenges. For example, IoT volumetric capture techniques require volumetric arrays, which often comprise an array of IoT cameras positioned within a recording studio; often, such recording studios are quite large, and subjects do not utilize the entire area of the studio floor. As a result, volumetric arrays positioned to capture activity in a large area may be inefficient when the entirety of that large area is not being used; in such a scenario, not all volumetric devices are capturing meaningful information as only a few volumetric devices of the array are pointed at the actors. However, studios often bill for use of the entire volumetric array, and the video footage captured by the volumetric devices that are not pointed at the actor add to the cost of processing and rendering the overall corpus of captured footage. As such, it may be advantageous to, among other things, implement a system that automatically and dynamically identifies which volumetric devices are in capturing range of the subject over the course of a capturing session, and dynamically switches volumetric devices within the array on and off to ensure that only volumetric devices within capture range of the subject are operating at any given time during the capturing session. Therefore, the present embodiment has the capacity to improve the technical field of volumetric capture by improving the efficiency of the volumetric device array, and ensuring that no unusable or unwanted footage that doesn't include the subject is captured, thereby reducing the power needed, the amount of data generated for processing, the bandwidth necessary to transmit that data and the amount of computing resources needed to process the data; this in turn reduces the cost and complexity of recording volumetric video.

According to at least one embodiment, the invention is a method for volumetric capture using internet-of-things (IoT) based volumetric devices by constructing a graph data structure representing volumetric device network topology; detecting, by one or more volumetric devices, the subject, and publishing the subject's location details to a message broker; and recording volumetric data using at least a threshold number of volumetric devices by dynamically switching one or more of the recording devices from a standby state to a recording state and/or from a recording state to a standby state based on the volumetric device network topology and the subject's location details.

According to at least one embodiment the cameras may be integrated with location devices that enable the volumetric devices to identify their own position and/or orientation; location devices may include GPS receivers, gyroscopes, accelerometers, et cetera. Prior to constructing a graph data structure, one or more volumetric devices of the array may operate the location devices to identify volumetric device location data representing each volumetric device's respective geographical co-ordinates, position, orientation, current field of view, and/or area in capturing range. The volumetric devices may automatically update the centralized computing system with the volumetric device location data prior to constructing the graph data structure. Additionally or alternatively, the volumetric devices may automatically update the centralized computing system after the graph data structure has been initialized; the volumetric devices may provide updates at regular intervals, such as every half-second, second, minute, et cetera, and/or may provide updates to the centralized computing system in response to events; events may include any changes in the state of the volumetric device that may indicate a change in the volumetric device's location data, which may include automatic movements performed by the volumetric device or movements caused by outside forces acting on the volumetric device, such as a user repositioning the volumetric device manually. As an example, if a volumetric device is equipped with an accelerometer, the volumetric device may update the centralized computing system any time the volumetric device detects a reading from the accelerometer indicating that the volumetric device is experiencing motion. In another example, if a volumetric device is equipped with movement devices that enable the volumetric device to turn and change position automatically, the volumetric device may update the centralized computing system with volumetric device location data responsive to receiving and executing a command to operate any of the volumetric device's movement devices. Upon receiving volumetric device location data from a volumetric device, the centralized computing system may update the graph data structure in real time to reflect any changes in the volumetric device location data, such that the graph data structure is kept up to date and represents an accurate real-time representation of the volumetric device location data of some or all volumetric devices in the array.

According to at least one embodiment, all the volumetric devices are moved to recording state for subject detection in case the subject is not detected by a subset of recording volumetric devices within a predefined threshold time.

References in the specification to "one embodiment," "other embodiment," "another embodiment," "an embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to affect such feature, structure, or characteristic in connection with other embodiments whether or not explicitly described.

For purposes of the description hereinafter, the terms "upper", "lower", "right", "left", "vertical", "horizontal", "top", "bottom", and derivatives thereof shall relate to the disclosed structures and methods, as oriented in the drawing figures. The terms "overlying," "atop," "over," "on," "positioned on" or "positioned atop" mean that a first element is present on a second element wherein intervening elements, such as an interface structure, may be present between the first element and the second element. The term "direct contact" means that a first element and a second element are connected without any intermediary conducting, insulating, or semiconductor layers at the interface of the two elements.

In the interest of not obscuring the presentation of the embodiments of the present invention, in the following detailed description, some of the processing steps, materials, or operations that are known in the art may have been combined together for presentation and for illustration purposes and in some instances may not have been described in detail. Additionally, for brevity and maintaining a focus on distinctive features of elements of the present invention, description of previously discussed materials, processes, and structures may not be repeated with regard to subsequent Figures. In other instances, some processing steps or operations that are known may not be described. It should be understood that the following description is rather focused on the distinctive features or elements of the various embodiments of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to dynamically activate and de-activate volumetric capture devices of a volumetric capture array as a subject moves to continually record the subject with multiple volumetric devices.

Referring now to FIG. 1, computing environment 100 contains an example of an environment for the execution of at least some of the computer code involved in performing the inventive methods, such as code block 145, which may comprise volumetric array management program 108. In addition to code block 145, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 145, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 145 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in code block 145 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the volumetric array management program 108 may be a program enabled to dynamically activate and de-activate volumetric capture devices of a volumetric capture array as a subject moves to continually record the subject with multiple volumetric devices. The volumetric array management program 108 may, when executed, cause the computing environment 100 to carry out a volumetric array management process 200. The volumetric array management process 200 may be explained in further detail below with respect to FIG. 2. In embodiments of the invention, the volumetric array management program 108 may be stored and/or run within or by any number or combination of devices including computer 101, end user device 103, remote server 104, private cloud 106, and/or public cloud 105, peripheral device set 114, and/or on any other device connected to WAN 102. Furthermore, volumetric array management program 108 may be distributed in its operation over any number or combination of the aforementioned devices.

In embodiments, for example where one or more volumetric devices are integrated with an edge computing device, the volumetric array management program 108 may comprise a centralized message broker; the centralized message broker may be a functionality, module, subroutine, process, et cetera of volumetric array management program 108 that is run on a computing device that is a distinct and separate device from the edge computing devices comprising the volumetric devices. The computing device running the centralized message broker may be geographically distanced from the edge computing devices; for example, further than a threshold distance away. The centralized message broker may facilitate the transmission of messages between volumetric array management program 108 and the volumetric devices comprising edge computing devices, and may be configured to send and receive messages to and from volumetric devices via wired or wireless means.

Referring now to FIG. 2, an operational flowchart illustrating a volumetric array management process 200 is depicted according to at least one embodiment. At 202, the volumetric array management program 108 may construct a graph data structure representing a volumetric device network topology. In constructing the graph data structure, volumetric array management program 108 may query the volumetric devices of the volumetric device array to obtain the unique identification (UID) number of each volumetric device, in order to uniquely identify each volumetric device in the graph by its UID number. In embodiments, volumetric device location data representing the respective geographical co-ordinates, position, orientation, current field of view, and/or area in capturing range of each volumetric device comprising the array may be provided to the volumetric array management program 108 from an external source prior to creation of the graph data structure. In some embodiments, for example where volumetric devices are equipped with location devices that enable the volumetric devices to identify their own position and/or orientation such as GPS receivers, gyroscopes, accelerometers, et cetera, each of one or more volumetric devices may operate its integrated location devices to automatically identify its own volumetric device location data. The volumetric array management program 108 may query the volumetric devices to provide volumetric device location data prior to constructing the graph data structure, and/or the volumetric devices may automatically provide such volumetric device location data to the volumetric array management program 108.

Responsive to receiving UID numbers and/or volumetric device location data, the volumetric array management program 108 may construct a graph data structure representing the location data including position, orientation, current field of view, and area in the capturing range of each volumetric device of the array. In embodiments, for example where the volumetric devices can be repositioned, either automatically or manually, the volumetric array management program 108 may continually and/or dynamically update the graph data structure once it has been constructed with any changes to any volumetric device's location data such that the graph data structure represents an accurate representation of the volumetric device location data of each of the volumetric devices comprising the volumetric capture array. In embodiments, the volumetric array management program 108 may dynamically update the graph data structure to add or subtract volumetric devices in real time whenever volumetric devices are added or subtracted to the volumetric array; adding or removing volumetric devices from the graph data structure may merely require adding or subtracting nodes from the graph data structure without affecting rest of network, providing modularity and scalability as the graph data structure can be modified easily to ensure that it represents an accurate real-time representation of the volumetric array. The graph data structure may be discussed in greater detail with respect to FIG. 3.

At 204, the volumetric array management program 108 may, responsive to initializing a capture session, set all volumetric devices comprising a volumetric array to a recording state. The volumetric array management program 108 may receive a command to begin a volumetric capture session from an external source. A volumetric capture session may be a discrete, contiguous period of time during which a volumetric array continuously records one or more subjects within the total covered area of the volumetric array, such that any subject is recorded by multiple volumetric devices at any given moment so long as the subject remains within the total covered area of the volumetric array. The data recorded by the volumetric array during the volumetric capture session may be used to produce one or more volumetric assets of each subject. Each volumetric capture session may be associated with one or more subjects, which may be designated to volumetric array management program 108 by an external source prior to initialization of the volumetric capture session. Responsive to receiving the command to begin the volumetric capture session, the volumetric array management program 108 may operate and/or transmit commands to all volumetric devices comprising the volumetric array, instructing the volumetric devices to enter a recording state. In the recording state, volumetric devices may be online and actively recording volumetric data comprising visual and/or positional information of any subject within their associated capture area using whatever sensors they may be equipped with. Furthermore, in a recording state, volumetric devices may be actively communicating captured data to volumetric array management program 108, and/or to a centralized message broker. In embodiments, the volumetric array management program 108 may first power on any volumetric devices that are powered off.

At 206, the volumetric array management program 108 may identify a subject within a capture range of one or more volumetric devices. The capture range, or capture area, of a volumetric device may be the sub-region of the total covered area of the volumetric array that the volumetric device is capable of recording above a pre-provided threshold level of fidelity. For example, the capture range of a camera may be the maximum distance in front of that camera, and to either side, that the camera can perceive a subject above a certain level of visual clarity. The capture areas of all volumetric devices together comprise the total covered area of the volumetric array. Responsive to initializing the volumetric capture session, the volumetric array management program 108 may utilize machine vision techniques to identify the subject within the capture areas of one or more volumetric devices. In embodiments, the volumetric devices may be integrated with edge computing devices, such that the edge computing devices of the cameras themselves can utilize computer vision techniques to identify the subject in their own camera feeds, and transmit a message to volumetric array management program 108 and/or a centralized message broker. The message may indicate that the subject has been found, and may comprise at least the UID number of the volumetric device that identified the subject. The message may further include subject movement data regarding the location, movement, orientation, et cetera of the subject.

In embodiments of the invention, volumetric devices that have identified the subject within the volumetric device's capture range may continually transmit such messages at regular intervals for the full duration of the time that the subject is within the capture range of that volumetric device. In embodiments, if any volumetric device equipped with an edge computing device cannot identify the subject within a threshold period of time, the volumetric device may provide its sensor data to volumetric array management program 108 so that volumetric array management program 108 may attempt to identify the subject.

In embodiments, if volumetric array management program 108 determines that the subject is not present within the capture areas of any of the volumetric devices for a threshold period of time, the volumetric array management program 108 may terminate the volumetric capture session and instruct and/or operate all volumetric devices to enter a standby state or power down; the volumetric array management program 108 may further transmit an alert to a user device.

In embodiments, the volumetric array management program 108 may analyze the subject within the volumetric data using visual processing techniques to determine subject movement data, which may be data regarding the location, movement, orientation, et cetera of the subject within the total covered area, and which the volumetric array management program 108 may use to infer which volumetric device's capture area a subject may have moved into after exiting a previous capture area of a volumetric device, and/or to identify what volumetric devices are positioned to record the subject based on the subject's location.

At 208, the volumetric array management program 108 may set all volumetric devices that are not recording the subject to a standby state. Once the subject has been identified for the first time, the volumetric array management program 108 may search the graph data structure to look up all volumetric devices that have transmitted and/or are regularly transmitting messages indicating that they currently identify the subject within their capture area, and/or volumetric devices transmitting sensor feeds to volumetric array management program 108 within which volumetric array management program 108 can identify the subject. The volumetric array management program 108 may create a list of all volumetric devices currently recording the subject; the volumetric array management program 108 may identify all volumetric devices on the list as primary devices. The volumetric array management program 108 may identify all volumetric devices that are not on the list, which are neither sending messages nor sensor data within which volumetric array management program 108 can identify the subject, as secondary devices. The volumetric array management program 108 may consult the graph data structure to compile a list of secondary volumetric devices. In embodiments, the volumetric array management program 108 may update the graph data structure to label each volumetric device as primary or secondary. The volumetric array management program 108 may instruct all secondary devices to enter a standby state; the standby state may be a low-power operational state where a volumetric device is not fully active and draws a fraction of the power that the volumetric device draws in a recording state, but remains ready to quickly transition to the recording state in response to a command. In embodiments, the standby state may entail fully powering down the volumetric device. In embodiments, a volumetric device comprising a camera which is in a standby state may still periodically check for movement within its capture area. For example, as part of the standby state, the volumetric device may briefly resume full operational capability at regular intervals to check for movement before returning to a low-power state, and may transmit the sensor data to the volumetric array management program 108 so that the volumetric array management program 108 may check for movement. If the volumetric device comprises an edge computing device and detects movement, the volumetric device may transmit a message to the volumetric array management program 108.

At 210, the volumetric array management program 108 may, responsive to determining that one or more volumetric devices in a recording state are not within capture range of the subject, switch the one or more volumetric devices to a standby state. Here, the volumetric array management program 108 may monitor the sensor feeds and/or incoming messages from all primary volumetric devices, and may at regular intervals check to determine whether the subject is still in the capture area of the primary devices, for example by using machine vision techniques on the sensor feed and/or determining whether a primary device has not sent a message indicating that the subject is within the capture area of that volumetric device for a period of time exceeding a threshold value. If the volumetric array management program 108 determines that the subject is no longer within the capture area of a primary device, the volumetric array management program 108 may instruct and/or operate that primary device to enter a standby state, and may alter that primary device's label within the graph data structure to change the volumetric device's designation from primary device to secondary device.

In embodiments, responsive to a volumetric device changing from a primary device to a secondary device, the volumetric array management program 108 may consult the graph data structure to identify one or more volumetric devices adjacent to the changed device, or volumetric device that changed from a primary device to a secondary device; the adjacent devices may be volumetric devices with capture areas geographically adjacent to the capture area of the changed device. In embodiments, adjacent devices may additionally or alternatively be volumetric devices that are geographically located adjacent to the changed device. The volumetric array management program 108 may employ graph algorithms like breadth-first search to quickly find volumetric devices covering any given sub-region comprising the total covered area recorded by any volumetric devices of the volumetric array in identifying adjacent devices, which allows the volumetric array management program 108 to activate new volumetric devices when the subject moves to ensure that multiple volumetric devices are actively recording the subject at any given time during a volumetric recording session and/or while the subject is within the covered area. Adjacent devices for any given volumetric device may be determined dynamically when a volumetric device changes from primary to secondary, and/or may be determined for each volumetric device prior to the volumetric capture session.

At 212, the volumetric array management program 108 may, responsive to determining that one or more volumetric devices in a standby state are within capture range of the subject, switch the one or more volumetric devices to a recording state. Once a subject is detected by any one volumetric device in any given sub-region of the total covered area, the volumetric array management program 108 must ensure that the subject is being recorded by a threshold number of volumetric devices at any given moment, based on the minimum requirements for achieving a volumetric effect, needs of the user, and the objectives of the volumetric capture session; the threshold number of volumetric devices may be a numerical value representing a number of volumetric devices that must be recording a subject at any given time. The threshold number of volumetric devices may be pre-provided, and may be, for example, no less than three, as three volumetric devices may be the minimum required for volumetric capture. In embodiments, the threshold number of volumetric devices may represent a minimum number of volumetric devices that must be recording each subject at any given time; the volumetric array management program 108 may switch volumetric devices to recording from standby to ensure that the number of primary devices does not fall below the minimum primary device threshold. In embodiments, the threshold number of volumetric devices may represent an ideal number of primary devices that should be recording a subject at any given point; the volumetric array management program 108 may attempt to activate additional volumetric devices whenever the subject leaves the capture area of a primary device, in order to maintain the number of primary devices at the ideal primary device threshold, and may switch volumetric devices from recording to standby if the number of primary devices exceeds the threshold number of volumetric devices. In embodiments, the threshold number of volumetric devices may instead be a range, with a lower bound representing a minimum number of volumetric devices and an upper bound representing a maximum number of primary devices permitted to record a subject at any given time; putting an upper bound on the number of permitted volumetric devices may be desirable to throttle the number of primary devices and thereby limit the operational costs and volume of data incurred by the process.

In embodiments, if the number of primary devices falls below the threshold number of volumetric devices, the volumetric array management program 108 may activate additional volumetric devices; the volumetric array management program 108 may identify a subject's location based on subject movement data extracted from sensor data gathered by at least one of the volumetric devices. The volumetric array management program 108 may then search the graph data structure to identify all volumetric devices with capture areas that encompass the current location of the subject but are in a standby mode, and may switch one or more such volumetric devices to a recording mode.

In embodiments, for example where the volumetric array management program 108 identifies adjacent devices to a changed device, the volumetric array management program 108 may, responsive to determining that a primary device has changed to a secondary device, switch all adjacent devices of that changed device which are in a standby state to a recording state. In embodiments, the volumetric array management program 108 may identify which direction the subject moved to exit the capture area of the changed device based on the subject movement data; the volumetric array management program 108 may look up adjacent devices with capture areas covering the direction in which the subject moved, and switch those adjacent devices from a standby state to a recording state. In some embodiments, for example where one or more volumetric devices are configured for motion detection in a standby state, the volumetric array management program 108 may switch a volumetric device to a recording device to a standby state if motion is detected within the capture area of that volumetric device.

In embodiments, if no subject is detected within a pre-provided period of time greater than a threshold duration, the volumetric array management program 108 may switch all volumetric devices to a recording state. The threshold duration may be pre-provided, and may represent a period of time, such as thirty seconds, above which the volumetric array management program 108 may be presumed to have failed or encountered delays, at which point quick acquisition of the subject may be desirable.

At 214, the volumetric array management program 108 may, responsive to concluding the volumetric capture session, set all volumetric devices comprising a volumetric array to a standby state. The volumetric array management program 108 may conclude the volumetric capture session responsive to receiving an external command, responsive to a pre-provided period of time elapsing, et cetera. In embodiments, if volumetric array management program 108 determines that the subject is not present within the capture areas of any of the volumetric devices for a period of time exceeding a final threshold duration during the volumetric capture session, wherein the final threshold duration is significantly longer than the threshold duration and represents a period of time so great that the subject can be presumed to be entirely absent from the total covered area, the volumetric array management program 108 may terminate the volumetric capture session. Responsive to concluding the volumetric capture session, the volumetric array management program 108 may instruct and/or operate all volumetric devices to enter a standby state or power down; the volumetric array management program 108 may further transmit an alert to a user device.

In embodiments, responsive to concluding the volumetric capture session, the volumetric array management program 108 may create a volumetric asset for each of the one or more subjects based on volumetric data recorded by the volumetric devices.

Figure 3:
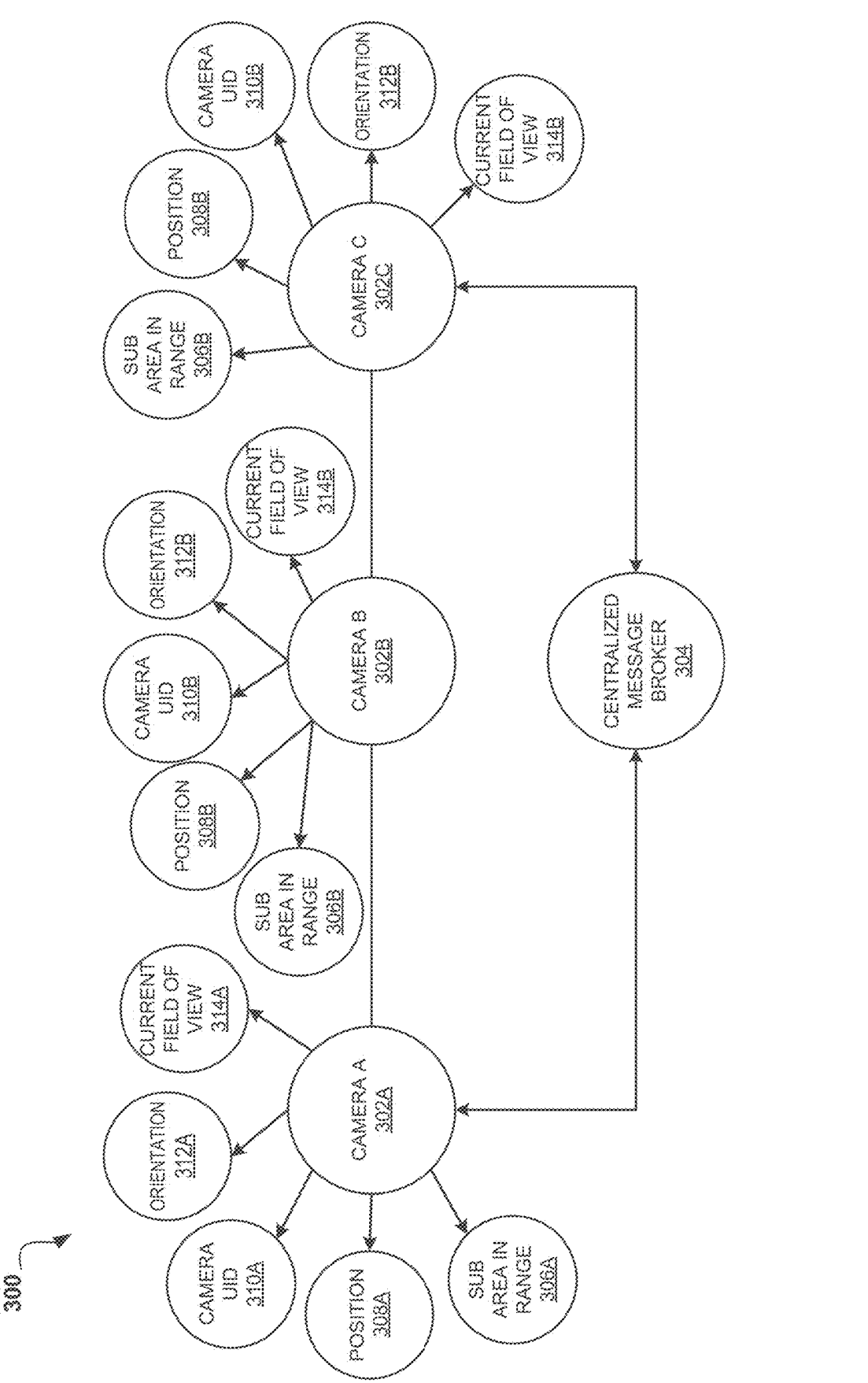
FIG. 3 is a diagram illustrating an exemplary graph data structure according to at least one embodiment.

Referring now to FIG. 3, an exemplary graph data structure 300 is depicted, according to at least one embodiment. Here, the volumetric array management system comprises three volumetric device nodes 302 representing cameras: camera A is represented by volumetric device node 302A, camera B is represented by volumetric device node 302B, and camera C is represented by volumetric device node 302C. The edges between the volumetric device nodes 302 represent connectivity between the cameras. Each of the volumetric device nodes 302 contain the parameters of sub area in range 306, position 308, camera UID 310, orientation 312, and current field of view 314. The UID 310 may be used to identify the camera corresponding to the volumetric device nodes 302 for the graph data structure representing the network topology, and may be used in constructing the graph data structure representing the network topology.

Each volumetric device node 302 runs real-time computer vision algorithms to detect and segment subjects in the captured footage using techniques like background subtraction, object detection, You Only Look Once (YOLO) version 3, et cetera. An object detection model is used to identify a 2D bounding box and generate 3D bounding boxes using depth-sensor information. In embodiments, all the cameras represented by volumetric device nodes 302 are switched on at the beginning of the volumetric capture; based on the object detection in its capturing range, cameras represented by volumetric device nodes 302 will continue to capture or move to standby mode. Once a camera represented by a volumetric device node 302 detects a subject in its field of view, the camera publishes details such as camera_id, subject_id, timestamp, 3D_position, et cetera to the centralized message broker 304. All cameras represented by volumetric device nodes 302 are subscribed to the centralized message broker 304, and the cameras represented by volumetric device nodes 302 fetch messages related to subject detection and location updates from the centralized message broker 304.

Figure 4:
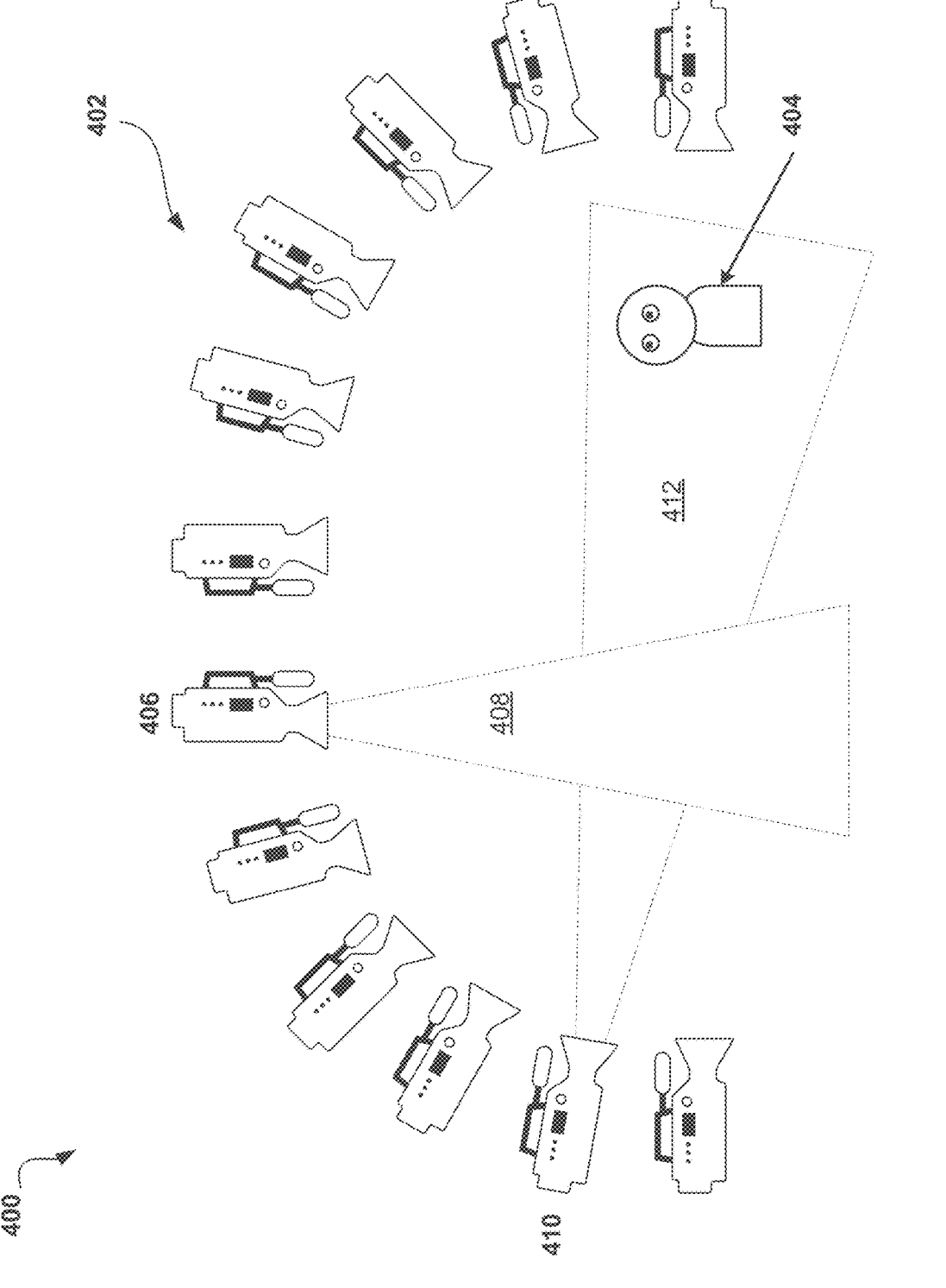
FIG. 4 is a diagram illustrating an exemplary volumetric array management system according to at least one embodiment.

Referring now to FIG. 4, a volumetric array management system 400 is depicted according to at least one embodiment. Here, a volumetric capture array 402 comprises a number of cameras within a studio, including camera 406 and camera 410, that are directed to capture a subject 404. Camera 406 has a capture area 408; camera 410 has a capture area 412.

It may be appreciated that FIGS. 2-4 provide only illustrations of individual implementations and do not imply any limitations with regard to how different embodiments may be implemented. Many modifications to the depicted environments may be made based on design and implementation requirements. For example, while embodiments may be described with respect to one subject, one skilled in the art would understand the invention to apply equally to embodiments with multiple subjects.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor implemented method for volumetric capture, the method comprising:

constructing a graph data structure representing a network topology of a volumetric array; and continually recording volumetric data of a subject using at least a threshold number of volumetric devices comprising the volumetric array, by:

detecting the subject within a capture range of one or more of the volumetric devices;

responsive to determining that one or more volumetric devices in a recording state are not within the capture range of the subject, switching the one or more volumetric devices to a standby state; and responsive to determining that one or more volumetric devices in the standby state are within the capture range of the subject, switching the one or more volumetric devices in the standby state to the recording state.

2. The method of claim 1, responsive to determining that the subject is not within the capture range of any of the volumetric devices for a threshold duration, switching all volumetric devices to the recording state.

3. The method of claim 1, wherein the one or more volumetric devices comprise an edge computing device, and wherein the detecting is performed by the one or more volumetric devices.

4. The method of claim 1, wherein the recording further comprises:

identifying one or more of the volumetric devices as one or more adjacent devices with adjacent capture ranges to the capture range; and responsive to determining that the subject has left the capture range, switching the one or more adjacent devices associated with the volumetric device to the recording state.

5. The method of claim 1, wherein the recording further comprises:

identifying a plurality of the volumetric devices as adjacent devices with adjacent capture ranges to the capture range;

determining subject movement data from data recorded by the one or more volumetric devices; and responsive to determining that the subject has left the capture range, switching one or more of the adjacent devices to the recording state based on the subject movement data.

6. The method of claim 1, wherein the volumetric devices comprise one or more location devices, and wherein the constructing comprises querying the volumetric devices for a UID, position, sub area in range, orientation, or current field of view.

7. The method of claim 1, further comprising: creating a volumetric asset representing the subject based on the volumetric data.

8. A computer system for volumetric capture, the computer system comprising:

a volumetric array comprising one or more volumetric devices, one or more processors, one or more computer readable memories, at least one computer readable storage medium, and program instructions stored on at least one of the at least one computer readable storage medium for execution by at least one of the one or more processors via at least one of the one or more computer readable memories, wherein the computer system is capable of performing a method comprising:

constructing a graph data structure representing a network topology of the volumetric array; and continually recording volumetric data of a subject using at least a threshold number of the volumetric devices, by:

detecting the subject within a capture range of one or more of the volumetric devices;

responsive to determining that one or more volumetric devices in a recording state are not within the capture range of the subject, switching the one or more volumetric devices to a standby state; and responsive to determining that one or more volumetric devices in the standby state are within the capture range of the subject, switching the one or more volumetric devices in the standby state to the recording state.

9. The computer system of claim 8, responsive to determining that the subject is not within the capture range of any of the volumetric devices for a threshold duration, switching all volumetric devices to the recording state.

10. The computer system of claim 8, wherein the one or more volumetric devices comprise an edge computing device, and wherein the detecting is performed by the one or more volumetric devices.

11. The computer system of claim 8, wherein the recording further comprises:

identifying one or more of the volumetric devices as one or more adjacent devices with adjacent capture ranges to the capture range; and responsive to determining that the subject has left the capture range, switching the one or more adjacent devices associated with the volumetric device to the recording state.

12. The computer system of claim 8, wherein the recording further comprises:

identifying a plurality of the volumetric devices as adjacent devices with adjacent capture ranges to the capture range;

determining subject movement data from data recorded by the one or more volumetric devices; and responsive to determining that the subject has left the capture range, switching one or more of the adjacent devices to the recording state based on the subject movement data.

13. The computer system of claim 8, wherein the volumetric devices comprise one or more location devices, and wherein the constructing comprises querying the volumetric devices for a UID, position, sub area in range, orientation, or current field of view.

14. The computer system of claim 8, further comprising: creating a volumetric asset representing the subject based on the volumetric data.

15. A computer program product for volumetric capture, the computer program product comprising:

at least one computer readable storage medium and program instructions stored on the at least one computer readable storage medium, the program instructions executable by a processor to cause the processor to perform a method comprising:

constructing a graph data structure representing a network topology of a volumetric array; and continually recording volumetric data of a subject using at least a threshold number of volumetric devices comprising the volumetric array, by:

detecting the subject within a capture range of one or more of the volumetric devices;

responsive to determining that one or more volumetric devices in a recording state are not within the capture range of the subject, switching the one or more volumetric devices to a standby state; and responsive to determining that one or more volumetric devices in the standby state are within the capture range of the subject, switching the one or more volumetric devices in the standby state to the recording state.

16. The computer program product of claim 15, responsive to determining that the subject is not within the capture range of any of the volumetric devices for a threshold duration, switching all volumetric devices to the recording state.

17. The computer program product of claim 15, wherein the one or more volumetric devices comprise an edge computing device, and wherein the detecting is performed by the one or more volumetric devices.

18. The computer program product of claim 15, wherein the recording further comprises:

identifying one or more of the volumetric devices as one or more adjacent devices with adjacent capture ranges to the capture range; and responsive to determining that the subject has left the capture range, switching the one or more adjacent devices associated with the volumetric device to the recording state.

19. The computer program product of claim 15, wherein the recording further comprises:

identifying a plurality of the volumetric devices as adjacent devices with adjacent capture ranges to the capture range;

determining subject movement data from data recorded by the one or more volumetric devices; and responsive to determining that the subject has left the capture range, switching one or more of the adjacent devices to the recording state based on the subject movement data.

20. The computer program product of claim 15, wherein the volumetric devices comprise one or more location devices, and wherein the constructing comprises querying the volumetric devices for a UID, position, sub area in range, orientation, or current field of view.

\* \* \* \* \*